(12) United States Patent
Tiirola et al.

(10) Patent No.: US 12,355,703 B2
(45) Date of Patent: Jul. 8, 2025

(54) MONITORING PHYSICAL DOWNLINK CONTROL CHANNEL

(71) Applicant: NOKIA TECHNOLOGIES OY, Espoo (FI)

(72) Inventors: Esa Tapani Tiirola, Oulu (FI); Kari Juhani Hooli, Oulu (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 622 days.

(21) Appl. No.: 17/753,471

(22) PCT Filed: Sep. 9, 2019

(86) PCT No.: PCT/EP2019/073969
§ 371 (c)(1),
(2) Date: Mar. 3, 2022

(87) PCT Pub. No.: WO2021/047749
PCT Pub. Date: Mar. 18, 2021

(65) Prior Publication Data
US 2022/0337374 A1    Oct. 20, 2022

(51) Int. Cl.
*H04L 5/00* (2006.01)
*H04W 72/23* (2023.01)

(52) U.S. Cl.
CPC ........... *H04L 5/0053* (2013.01); *H04W 72/23* (2023.01)

(58) Field of Classification Search
CPC .................................................... H04W 72/23
See application file for complete search history.

(56) References Cited

U.S. PATENT DOCUMENTS

2019/0223159 A1    7/2019   John Wilson et al.

FOREIGN PATENT DOCUMENTS

| CN | 109802758 A | 5/2019 |
|---|---|---|
| CN | 108173637 B | 10/2021 |
| WO | 2018204886 A1 | 11/2018 |
| WO | 2019069212 A1 | 4/2019 |
| WO | 2019099738 A1 | 5/2019 |

OTHER PUBLICATIONS

International Search Report and Written Opinion for International Application No. PCT/EP2019/073969; mailed on May 14, 2020; 13 pages.
3GPP TSG RAN WG1 NR Adhoc#3, R1-1716306; "On CORESETs and Search Spaces", Source: Intel Corporation; Agenda Item: 6.3.1.2; Nagoya, Japan; Sep. 18-21, 2017; 12 pages.
Office Action and Search Report for Chinese Patent Application No. 201980102086.X, mailed on Jun. 28, 2024, 14 pages.
3GPP TSG RAN WG1 Meeting #89; R1-1708109; "Configuration of CORESET and Search Space Design"; Source: Panasonic; Agenda Item: 7.1.3.1.2; Hangzhou, P.R. China; May 15-19, 2017, 3 pages.
Examination Report for India Application No. 202247020419, mailed on Aug. 5, 2022, 6 pages.
Second Office Action for Chinese Patent Application No. 201980102086.X, mailed on Nov. 13, 2024, 6 pages.

*Primary Examiner* — Samina F Choudhry
(74) *Attorney, Agent, or Firm* — Brake Hughes Bellermann LLP (57) ABSTRACT

To monitor physical downlink control channel, a wireless device is configured at least with one configuration for physical downlink control channel monitoring, a configuration defining a minimum monitoring period, which comprises a plurality of slots, a control resource set occupying one or more symbols in one or more slots at the beginning of the minimum monitoring period, and one or more search spaces associated with the control resource set.

20 Claims, 4 Drawing Sheets

MONITORING PHYSICAL DOWNLINK CONTROL CHANNEL

CROSS-REFERENCE TO RELATED APPLICATIONS

This application is a national stage entry of International Application No. PCT/EP2019/073969, filed Sep. 9, 2019, entitled "MONITORING PHYSICAL DOWNLINK CONTROL CHANNEL" which is hereby incorporated by reference in its entirety.

TECHNICAL FIELD

Various example embodiments relate to wireless communications and, particularly, to monitoring physical downlink control channel.

BACKGROUND

Wireless communication systems are under constant development. An example is taking into use spectrum above 52.6 GHz, such as bands 70/80/92-114 GHz. The spectrum above 52.6 GHz has different properties than spectrum up to 52.6 GHz, which need to be taken into account, for example in monitoring physical downlink control channel.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising means for performing: receiving from a network node a first configuration for physical downlink control channel monitoring, the first configuration defining a first minimum monitoring period, which comprises a plurality of slots, a first control resource set occupying one or more symbols in one or more slots at the beginning of the first minimum monitoring period, and one or more search spaces associated with the first control resource set; and performing downlink control channel monitoring periodically with a first monitoring periodicity, which is N times the first minimum monitoring period, wherein N is a positive integer, by monitoring according to the received first configuration the one or more symbols in the one or more slots at the beginning of a first monitoring period.

In an embodiment, the means are further configured to: receiving a second configuration for physical downlink control channel monitoring, the second configuration defining a second minimum monitoring period, which comprises a plurality of slots, a second control resource set occupying one or more symbols in one or more slots at the beginning of the second minimum monitoring period, and one or more search spaces associated with the second control resource set; and performing downlink control channel monitoring periodically with a second monitoring periodicity, which is M times the second minimum monitoring period, wherein M is a positive integer, by monitoring according to the received second configuration the one or more symbols in the one or more slots at the beginning of a second monitoring period.

In an embodiment, the second minimum monitoring period comprises the same amount of slots as the first minimum monitoring period.

In an embodiment, the first control resource set occupies a different number of symbols than the second control resource set.

In an embodiment, the means are further configured to perform the downlink control channel monitoring with the second monitoring periodicity using the same demodulation reference signal sequence, which is used for the downlink control channel monitoring with the first monitoring periodicity.

In an embodiment, the first control resource set and the second control resource set overlap at least partially in time and the means are further configured to perform the downlink control channel monitoring using the same channel estimates or the same demodulation reference signal sequence.

In an embodiment, the search space defines one or more monitoring occasions with occurrence periodicity with respect to the corresponding minimum monitoring period and the occurrence periodicity defines how many minimum monitoring periods the corresponding monitoring period comprises.

In an embodiment, the means are further configured to perform: detecting in the one or more symbols monitored a resource allocated to the apparatus, the resource comprising one or more symbols within the corresponding minimum monitoring period; receiving, in response to the resource allocated being a downlink resource, data in the resource; and transmitting, in response to the resource allocated being an uplink resource, data in the resource.

In an embodiment, the means are further configured to perform data mapping to the resource based on information received in the one or more symbols monitored, and based on the size of the corresponding control resource set.

In an embodiment, in the received configuration the one or more slots at the beginning of the corresponding minimum monitoring period are followed by one or more slots not occupied by the control resource set in the corresponding minimum monitoring period.

Another aspect provides an comprising means for performing: determining a first configuration for physical downlink control channel monitoring, the first configuration defining a first minimum monitoring period, which comprises a plurality of slots, a first control resource set occupying one or more symbols in one or more slots at the beginning of the first minimum monitoring period, and one or more search spaces associated with the control resource set; transmitting the first configuration in a cell provided by the apparatus to configure at least one wireless device in the cell for periodic downlink control channel monitoring with a first monitoring periodicity, which is N times the first minimum monitoring period, wherein N is a positive integer; scheduling transmissions by allocating resources within the first minimum monitoring period at least from one or more slots not having symbols occupied by the first control resource set; and transmitting, according to the first configuration, within the one or more symbols, information indicating the resources.

In an embodiment, the means are further configured to perform: determining at least one second configuration for physical downlink control channel monitoring, the second configuration defining a second minimum monitoring period, which comprises a plurality of slots, a second control resource set occupying one or more symbols in one or more slots at the beginning of the second minimum monitoring period, and one or more search spaces associated with the second control resource set; transmitting the second configuration in the cell to configure at least one wireless device in the cell for periodic downlink control channel monitoring with a second monitoring periodicity, which is M times the second minimum monitoring period, wherein M is a positive integer; scheduling transmissions by allocating resources within the second minimum monitoring period at least from one or more slots not having symbols occupied by the second control resource set; and transmitting, according to the second configuration, within the one or more symbols, information indicating the resources.

In an embodiment, the means are further configured to determine which one of the first and second configurations to use based on aggregation level and/or beam width used.

In an embodiment, the first control resource set provides one of a single slot per transport block scheduling and a repetitive transport block scheduling, wherein in the single slot per transport block scheduling transport blocks are mapped to single transport blocks, and/or multiple transport blocks are mapped to multiple slots, and each transport block is transmitted in a single slot, and wherein in the repetitive transport block scheduling a single transport block per spatial layer is mapped to multiple slots, and one transport block is transmitted in each of the multiple slots.

In an embodiment, the first control resource set provides one of a single slot per transport block scheduling and a repetitive transport block scheduling, and the second control resource set provides another one of the single slot per transport block scheduling and the repetitive transport block scheduling, wherein in the single slot per transport block scheduling transport blocks are mapped to single transport blocks, and/or multiple transport blocks are mapped to multiple slots, and each transport block is transmitted in a single slot, and wherein in the repetitive transport block scheduling a single transport block per spatial layer is mapped to multiple slots, and one transport block is transmitted in each of the multiple slots.

In an embodiment, the means are further configured to support one or more subcarrier spacings including and above 240 kHz.

In an embodiment, the means comprises at least one processor and at least one memory including a computer program code, wherein the at least one memory and the computer program code are configured, with the at least one processor, to cause the performance of the apparatus.

A further aspect provides a method comprising configuring an apparatus with at least one configuration for physical downlink control channel monitoring, wherein a configuration defines a minimum monitoring period, which comprises a plurality of slots, a control resource set occupying one or more symbols in one or more slots at the beginning of the minimum monitoring period, and one or more search spaces associated with the control resource set.

In an embodiment, the method further comprises configuring the apparatus by receiving in the apparatus the at least one configuration; and performing downlink control channel monitoring periodically with a monitoring periodicity, which is N times the minimum monitoring period, wherein N is a positive integer, by monitoring according to the configuration the one or more symbols in the one or more slots at the beginning of a monitoring period.

In an embodiment, the method further comprises detecting in the one or more symbols monitored a resource allocated to the apparatus, the resource comprising one or more symbols not occupied by the control resource set within the minimum monitoring period; receiving, in response to the resource allocated being a downlink resource, data in the resource; and transmitting, in response to the resource allocated being an uplink resource, data in the resource.

In an embodiment, the minimum monitoring period comprises after the one or more slots at the beginning one or more slots not occupied by the control resource set.

In an embodiment, the method further comprises: determining, by a second apparatus providing a cell, the at least one configuration; configuring the apparatus for periodic downlink control channel monitoring with a monitoring periodicity, which is N times the minimum monitoring period, wherein N is a positive integer, by transmitting, by the second apparatus, the at least one configuration in the cell; scheduling, by the second apparatus, transmissions by allocating resources within the minimum monitoring period at least from one or more slots not having symbols occupied by the control resource set; and transmitting, according to the at least one configuration, within the one or more symbols, information indicating the resources.

An aspect provides a computer program product embodied on a computer-readable medium and comprising a computer program code readable by a computing device, wherein the computer program code configures the computing device to carry out a computer process comprising: configuring the computing device with received at least one configuration for physical downlink control channel monitoring, a configuration defining a minimum monitoring period, which comprises a plurality of slots, a control resource set occupying one or more symbols in one or more slots at the beginning of the minimum monitoring period, and one or more search spaces associated with the control resource set; and performing downlink control channel monitoring periodically with a monitoring periodicity, which is N times the minimum monitoring period, wherein N is a positive integer, by monitoring according to the received configuration the one or more symbols in the one or more slots at the beginning of the minimum monitoring period.

Another aspect provides a computer program product embodied on a computer-readable medium and comprising a computer program code readable by a computing device, wherein the computer program code configures the computing device to carry out a computer process comprising: determining at least one configuration for physical downlink control channel monitoring, a configuration defining a minimum monitoring period, which comprises a plurality of slots, a control resource set occupying one or more symbols in one or more slots at the beginning of the minimum monitoring period, and one or more search spaces associated with the control resource set; causing transmitting the configuration in a cell provided by the computing device to configure at least one wireless device in the cell for periodic downlink control channel monitoring with a monitoring periodicity, which is N times the minimum monitoring period, wherein N is a positive integer; scheduling transmissions by allocating resources within the minimum monitoring period at least from one or more slots not having symbols occupied by the control resource set; and causing transmitting, according to the configuration, within the one or more symbols, information indicating the resources.

An aspect provides a computer program comprising instructions which, when the program is executed by a computing device, cause the computing device to carry out: configuring the computing device with received at least one configuration for physical downlink control channel monitoring, a configuration defining a minimum monitoring period, which comprises a plurality of slots, a control resource set occupying one or more symbols in one or more slots at the beginning of the minimum monitoring period, one or more search spaces associated with the control resource set; and performing downlink control channel monitoring periodically with a monitoring periodicity, which is N times the minimum monitoring period, wherein N is a positive integer, by monitoring according to the received configuration the one or more symbols in the one or more slots at the beginning of the minimum monitoring period.

A further aspect provides a computer program comprising instructions which, when the program is executed by a computing device configured to provide a cell, cause the computing device to carry out: determining at least one configuration for physical downlink control channel monitoring, a configuration defining a minimum monitoring period, which comprises a plurality of slots, a control resource set occupying one or more symbols in one or more slots at the beginning of the minimum monitoring period, and one or more search spaces associated with the control resource; causing transmitting the configuration in the cell to configure at least one wireless device in the cell for periodic downlink control channel monitoring with a monitoring periodicity, which is N times the minimum monitoring period, wherein N is a positive integer; scheduling transmissions by allocating resources within the minimum monitoring period at least from one or more slots not having symbols occupied by the control resource set; and transmitting, according to the configuration, within the one or more symbols, information indicating the resources.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
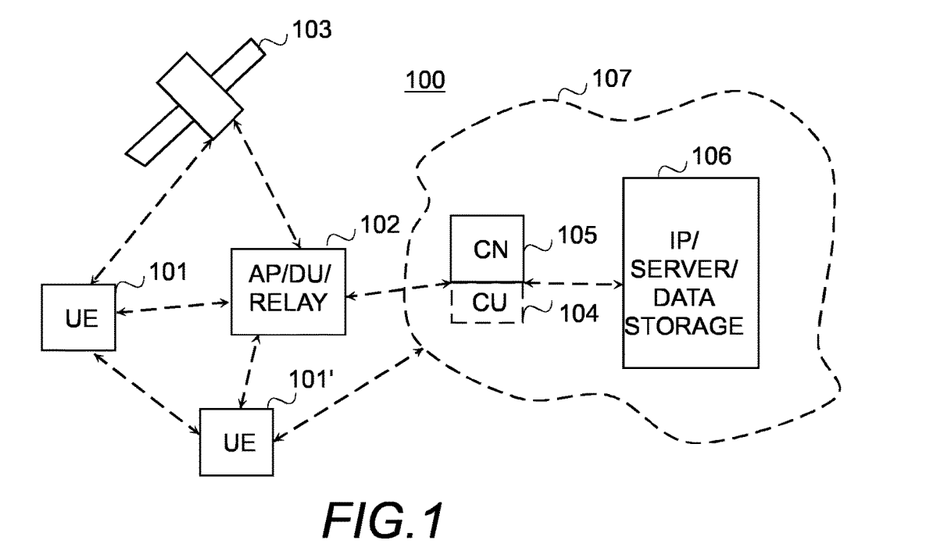
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The new radio up to 52.6 GHz supports bandwidth part (BWP) size of up to 275 physical resource blocks (PRBs). This means that the maximum size is 792 MHz (12 subcarriers/PRB×275 PRBs×240 kHz/subcarrier). In systems, for the new radio, or beyond 5G, supporting spectrum above 52.6 GHz, such as bands 70/80/92-114 GHz, channel bandwidth may be much more higher, for example as high as 10 GHz. Additionally, phase noise will also increase. To overcome the phase noise and to provide higher bandwidths, subcarrier spacing has to be increased. This means that subcarrier spacings above 240 kHz should be supported. However, based on scaling of the new radio up to 52.6 GHz, physical downlink control channel monitoring increases power consumption in user devices when subcarrier spacing increases and the scheduling flexibility of user devices is not limited. One way to minimize the power consumption is to use physical downlink control channel configurations that minimize the power consumptions required by the monitoring in the user devices.

Figure 2:
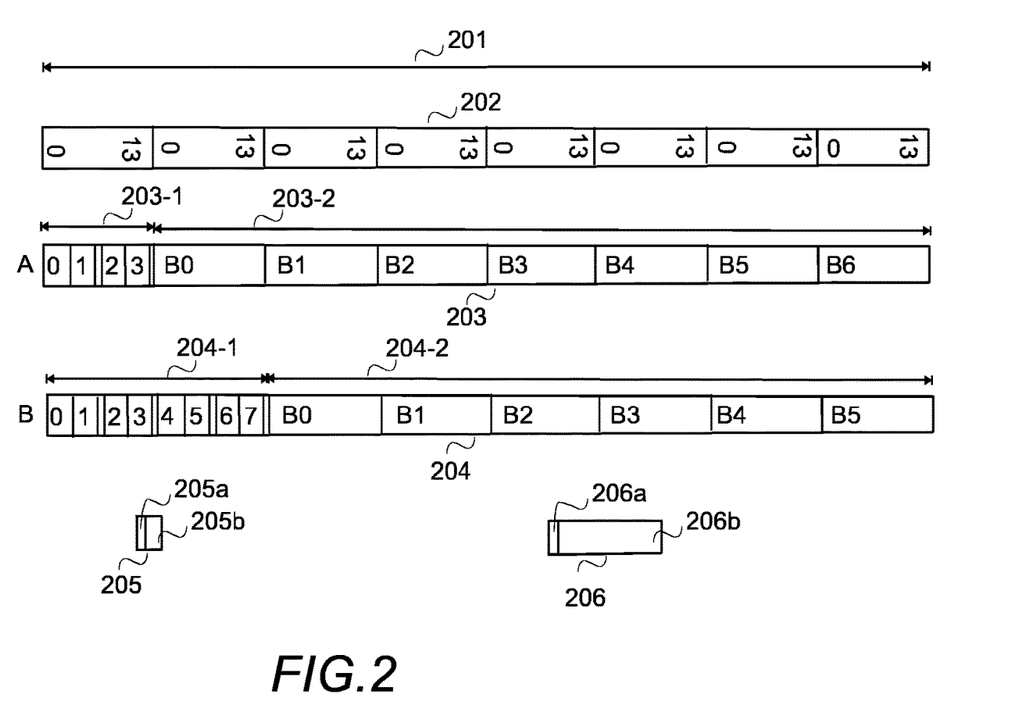
FIGS. 2 to 4 illustrates examples of configurations.
Figure 3:
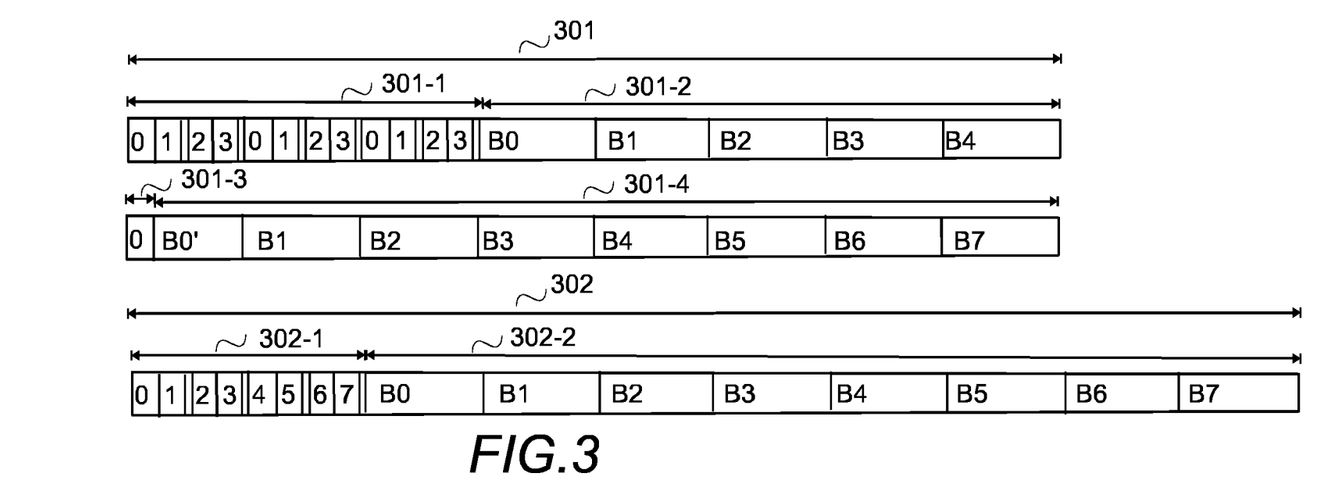

FIGS. 2 and 3 illustrate examples for such configurations for physical downlink control channel. The disclosed principles for configurations support subcarrier spacing 240 kHZ and subcarrier spacings above 240 kHz, such as 480 kHz ($=2^5 \times 15$ kHz), 960 kHz ($=2^6 \times 15$ kHz), and other $2^\mu \times 15$ kHz, $\mu$ being a parameter called a transmission numerology, $\mu \geq 4$ are candidate values for above 52.6 GHz, but they may be used with any subcarrier spacings. The illustrated physical downlink control channel configurations, or shortly configurations, do not change the concepts of control resource sets and associated search spaces but introduce a new parameter and places for the control resource sets using different principle than what is used with the new radio up to 52.6 GHz, as explained below. As is known, a control resource set defines frequency and time-domain resources for a physical downlink control channel and a search space defines, which downlink control information (DCI) formats a user device monitors, and when. Furthermore, each search space is associated with one control resource set, and several search spaces may be associated with one control resource set. In other words, a search space defines monitoring occasions within a control resource set the search space is associated with. A frequency and time-domain resource, defined in a control resource set, defines orthogonal frequency division multiplex (OFDM)/single carrier frequency division multiplex (SC-FDM) symbols and physical resource blocks (PRBs), which are available for one or more search spaces associated with the control resource set.

FIG. 2 illustrates example configurations that use a structure with 8 slots, i.e. 0.125 ms with 960 kHz subcarrier spacing. FIG. 2 further illustrates how the example configurations map to a slot grid. It should be appreciated that the principles disclosed in FIG. 2 can be implemented to any other amount of slots as well, depicted by an example in FIG. 3. The advantage of the disclosed examples in FIG. 2 include that they provide $\frac{1}{8}^{th}$ physical downlink control channel monitoring frequency in time domain. Further, the disclosed examples maintain commonality with the radio frame structure defined for new radio up to 52.6 GHz.

Referring to FIG. 2, the new parameter, which is a minimum monitoring period 201, called herein a period A, comprises a plurality of slots over a slot grid 202. The period A is used in different configurations 203, 204 to define a minimum physical downlink control channel monitoring period. Further, the period A is divided in time to two parts: a beginning part followed by a part called herein a minimum scheduling unit. The beginning part comprises one or more slots, which is/are at least partially reserved for (occupied by) a control resource set. At least partially means that the control resource set may occupy only part of the resources, i.e. one or more symbols, in one slot, thereby allowing physical downlink shared channel data to be transmitted in the beginning part in the resources (symbols) not occupied by the control resource set. The minimum scheduling unit in time comprises in the period A the remaining one or more slots, wherefrom no resources are reserved for the control resource set, the slots in the minimum scheduling unit being for data transport.

The minimum physical downlink control channel monitoring period 201, i.e. the period A, is same for both configurations in FIG. 2. Control resource sets 203-1, 204-1 are defined by means of control channel elements (CCEs) 205, denoted in configurations 203, 204 by running numbers. More precisely, control channel elements 0 to 3 form a control resource set 203-1 and control channel elements 0 to 7 form a control resource set 203-2.

The minimum scheduling unit 203-2, 204-2 in time is defined by means of "transport elements" 206, which are in the period A slots that are not reserved for control channel elements, denoted in configurations 203, 204 by letter B and a running number.

In the illustrated example of FIG. 2, a control channel element 205 comprises a physical downlink control channel demodulation reference signal (PDCCH DMRS) 205a and a physical downlink control channel downlink control information (PDCCH DCI) 205b. A "transport element" 206, i.e. a slot not reserved for control channel elements (control resource sets), comprises a demodulation reference signal (DMRS) 206a and a channel 206 b. The channel 206b is a physical downlink shared channel (PDSCH), a physical uplink shared channel (PUSCH), or a physical uplink control channel (PUCCH). It should be appreciated that the illustrated structures of the elements disclose only one example how the content may be arranged in an element, and any other way to arrange the content may be used. For example, the demodulation reference signal (DMRS) 206a may locate in the middle of the channel 206b.

As can be seen from the examples, the control channel elements 0 to 3, or 0 to 7 locate at the beginning of the period A. In other words, a control resource set locates at the beginning of the period A, and associated one or more search spaces with corresponding monitoring occasions locate at the beginning of every $x^{th}$ period A. In other words, the search space definitions define a monitoring occasion periodicity, i.e. monitoring occasions with reference to the period A. For example, a monitoring occasion may occur in each period A, or in every second period A, or in every third period A, or every fourth period A, etc., depending on the search space definitions. This will enable smooth pipeline processing for user devices. Furthermore, this will minimize unnecessary buffering of fast fourier transform (FFT) samples at the user devices.

Both of the illustrated configurations 203, 204 associate the physical downlink control channel configuration with the number of slots (transport elements) B0 to B6 or B0 to B5 per spatial layer per scheduling unit in time. This balances the physical downlink control channel coverage with the physical downlink shared channel coverage, the physical uplink shared channel coverage and physical uplink control channel coverage.

A single downlink control information message is used to indicate scheduling information to a user device. Mapping of transport blocks to transport elements may follow information given in a control resource set, detected during monitoring, or the mapping of the transport blocks may follow a predefined mapping. The mapping will be described in more detail below.

The physical downlink control channel configuration 203 is for a control resource set A. The control resource set A 203 is, with its search space(s), associated with a single transport block per spatial layer per slot, without transport block repetition. In other words, the associated slots B0, B1, B2, B3, B4, B5, B6 in the physical downlink control channel configuration 203 for the control resource set A do not repeat content or transport block in another slot and they may be freely scheduled. Such a single slot per transport block scheduling, in which a transport block is transmitted only within one slot, may be implemented by mapping single transport blocks to single slots and/or by mapping multiple transport blocks to multiple slots, and each transport block is transmitted in a single slot. For example, control channel element 0 may schedule transport block to slot B0 for a first user device, and control channel element 1 may schedule transport block to slot B1 for a second user device. Hence, the physical downlink control channel configuration 203 provides an example of a single transport block scheduling in which each physical downlink control channel schedules one slot and one transmission block. Scheduling delay for different slots may be indicated using the existing cross-slot scheduling framework for spectrum up to 52.6 GHz, and especially the parameter slot offset in the cross-slot scheduling framework. (The parameter slot offset may be noted as $K_0$ for PDSCH, $K_2$ for PUSCH and $K_1$ for PUCCH). As another example, control channel elements 0 and 1 may schedule transport blocks to slots B0, B1, B2, B3 and B4 for a first user device and control channel element 3 may schedule transport blocks to slots B5 and B6 for a second user device. In other words, the control resource set A provides an example of a multi-transport block scheduling, in which multiple transport blocks are mapped to multiple slots, wherein each transport block is transmitted in a single slot. The multi-transport block scheduling allows to minimize the length of the control resource set as a smaller amount of downlink control information needs to be signaled. Thanks to be able to schedule multiple transport blocks and slots to a user device with a single downlink control information message instead of a separate downlink control information message for each transport block and slot, repetition of some fields common for all downlink control information messages, for example an identifier of the user device and cyclic redundancy check, are avoided. This reduces the length of control resource set and the overall amount of associated downlink control information, and thereby physical downlink control channel overhead. As an example, a user device may be configured, as a predefined mapping, that the control resource set A means either single transport scheduling or multi-transport scheduling, which is signaled over the control resource set A.

The physical downlink control channel configuration 204 is for a control resource set B. The control resource set B 204 is, with its search space(s), associated with transport block repetition over multiple slots, in which a single transport block per spatial layer is mapped to multiple slots. In other words, the control channel elements 0 to 7 schedule the slots B0, B1, B2, B3, B4, B5 to transmit the same transport block (from/to the same user device). It should be appreciated that even in the repetitive transport block scheduling the slots B0 to B5 may contain at least partially different encoded bits of the same transport block. For example, different redundancy versions of the same transport block may be transmitted on the different slots B0 to B5. Alternatively, the slots B0 to B5 may contain different number of resource elements available for transport block transmission. Correspondingly, different rate matching or puncturing may be applied in different slots B0 to B5, resulting that at least partially different encoded bits of the same transport block are transmitted in different slots.

The illustrated configurations 203, 204 in FIG. 2 are aligned at least in time domain, have the same demodulation reference signal sequence and the same precoder granularity, and the control resource sets overlap at least partially. When a user device is configured with the illustrated two configurations, or with two or more configurations overlapping correspondingly, the user device may use the same channel estimates or the same demodulation reference signal sequence when performing the physical downlink control channel monitoring from the two or more search spaces. This minimizes channel estimation burden at the user device. For configurations that are not overlapping, the user device may use the same demodulation reference signal sequence.

Referring to FIG. 3, further examples of possible configurations are illustrated. Two of the configurations have the same period A 301 than the examples in FIG. 2. One of the configurations has a longer control resource set 301-1 and a shorter minimum scheduling unit 301-2 in time than in the examples in FIG. 2, whereas the other one illustrates that a control resource set 301-3 may occupy a slot only partially, in which case the first transport element B0' has less resources in time domain than the consecutive transport elements B1 to B7 and that the minimum scheduling unit 301-4 may also comprise in time domain a portion of a slot. One of the configurations has a longer period A 302 than any other illustrated example, with the same control resource set 302-1 as the configuration 204 in FIG. 2, and a longer minimum scheduling unit 302-2 in time than in any other illustrated example. The scheduling may follow a single slot per transport block scheduling principle described above with the control resource set A (configuration 203 in FIG. 2) or a repetitive transport block scheduling principle described above with the control resource set B (configuration 204 in FIG. 2), or may be a mixed block scheduling, in which a part of the slots may be scheduled using the repetitive transport block scheduling principle, and others using the single slot per transport block scheduling principle. For example, slots B0-B3 may be scheduled for transmission of the same transport block from/to the same user device and slots B4-B7 may be scheduled for transmission of different transport blocks, from/to user device(s).

Based on the examples, it is evident that the period A (the minimum monitoring period), as well as the number of control channel elements forming a control resource set, and an aggregation level, may each be determined as an independent parameter, whereas the transport block mapping is either predefined or defined with the control resource set. A predefined transport block mapping may follow a preset rule. For example, a rule may be that if, in the time domain, the length of symbols occupied by a control resource set equals to a specific portion of the period A, the mapping follows the repetitive transport block scheduling principle. The specific portion may be given as a parameter and it may be called a size of a control resource set (for the single slot per transport block scheduling principle, or for the repetitive transport block scheduling principle). Another rule may be that if, in the time domain, the length of symbols occupied by a control resource set is less than the specific portion of the period A, the mapping follows the single slot per transport block scheduling principle. The specific portion may be, for example, one fourth of the period A, illustrated by 204-1 in FIG. 2. Yet another rule may be that when a user device is configured with two or more different configurations, the mapping of the configuration, which has in the time domain the largest control resource set, follows the repetitive transport block scheduling principle. In other words, the mapping is based on the size of the control resource set. Another rule may be that when a user device is configured with two or more different configurations, the mapping of the configuration, which has in the time domain the smallest control resource set, follows the single slot per transport block scheduling principle. In other words, the mapping is based on the size of the control resource set and information received in monitored symbols, for example indicated by downlink control information. As is evident from the non-limiting examples of rules, a mapping rule depending at least partially on one or more control resource sets may be defined and applied. It should be appreciated that further parameters and/or parameter values than those disclosed above may be provided, for example a parameter for a configurable physical downlink control channel duration, to convey information on the configuration, or relating to the configuration.

The different control resource sets in the configurations illustrated in FIGS. 2 and 3, and in other corresponding configurations may, or may not, be separated in the frequency domain. When separated in the frequency domain, the physical downlink control channel downlink control information (PDCCH DCI) 205b in different configurations are transmitted from different transmission and reception points (TRPs), or from the same transmission and reception point, depending on the technical implementation of the transmission and reception point(s). When multiple transmission and reception points are used, physical downlink control channels from different transmission and reception points may be transmitted to a user device in parallel. This in turn increases pipeline processing capabilities.

Figure 4:
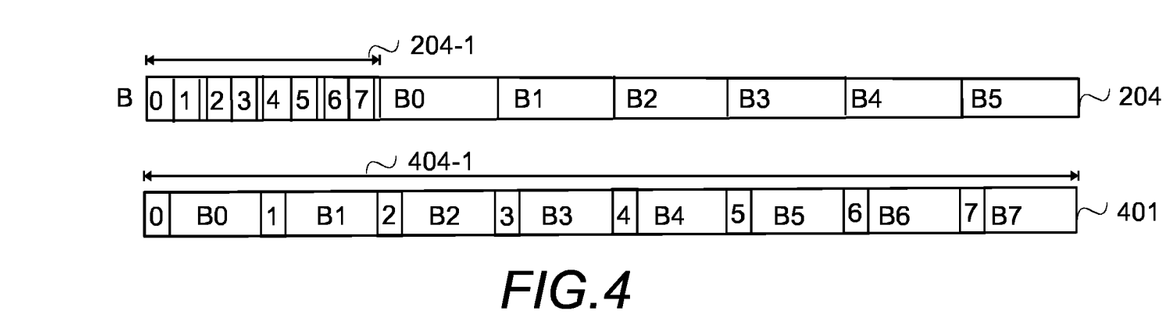

FIG. 4 illustrates a difference between the configuration 204 with control resource set B 204 illustrated in FIG. 2, and a configuration 401 with a control resource set having the same number of control channel elements. However, in the configuration 401, the control resource set is placed using for solutions above 52.6 GHz (to maintain physical downlink control channel coverage above 52.6 GHz) the same principles in scaling as are used in the new radio up to 52.6 GHz to support different subcarrier spacing values. As can be seen, the control resource set 404-1 in the configuration 401 is spread to each slot, which means that physical downlink control channel monitoring should be performed at the beginning of each slot, i.e. more frequently in time than in the configuration 204 (monitoring at the beginning of each $x^{th}$ period A). The more frequently in time the monitoring is performed, the higher is power consumption in the user device and the more data needs to be buffered. Furthermore, the configuration 401 has no slot in which no resources (no symbols) are reserved for a control resource set, whereas the control resource set B 204 has six such slots. In other words, the minimum scheduling unit in the configuration 401 is less than a slot, whereas in the control resource set B 204 the minimum scheduling unit is six slots.

Figure 5:
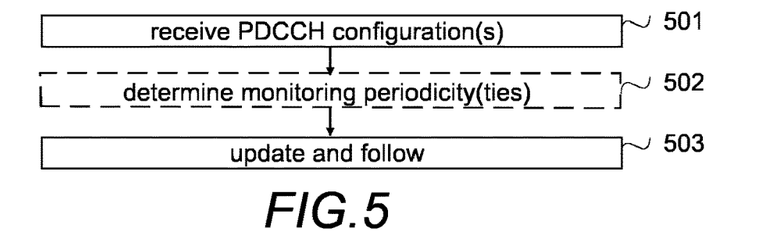
FIGS. 5 to 9 illustrate exemplified processes.
Figure 6:
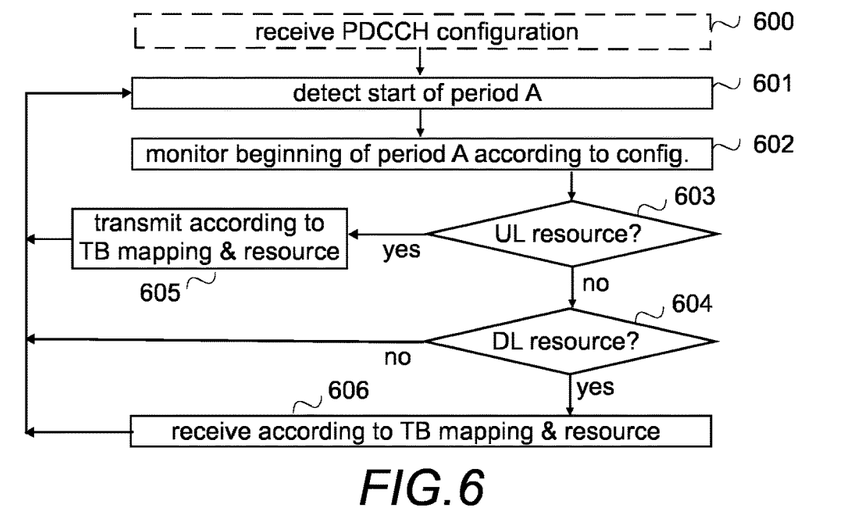
Figure 7:
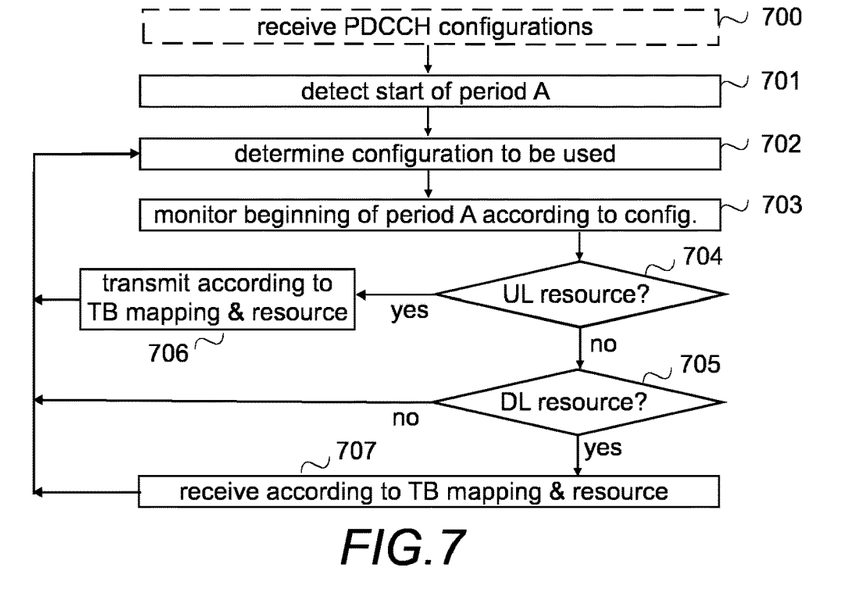

FIGS. 5 to 7 illustrate different functionality of a user device. The user device may be configured to implement the functionality for frequencies above 52.6 GHz. FIG. 5 describes how the user device is configured with one or more physical downlink configurations. FIG. 6 illustrates an example in which the user device comprises one configuration, for example one of the configurations 203 and 204 illustrated in FIG. 2, (or configurations having different period As, not aligned in time), and FIG. 7 an example in which the user device comprises two or more configurations, which have the same period A and are aligned in time domain, for example both configurations 203 and 204 illustrated in FIG. 2.

Referring to FIG. 5, the user device receives at block 501 a physical downlink control channel (PDCCH) configuration. The configuration may be a common configuration received during initial access, or a dedicated configuration received when the user device enters a radio resource control (RRC) connected state, or an update to a configuration received earlier. In the dedicated configuration one or more dedicated search spaces, associated with a control resource set, that may be the same or different than in the common configuration, are defined for the user device.

In response to receiving the configuration, the user device determines in block 502 a monitoring periodicity, which is N times period A, wherein N is a positive integer, indicated by occurrence periodicity in the search space definitions. (As described above with FIG. 2, the search space definitions define one or more monitoring occasions with the corresponding occurrence periodicity.) In other words, N may be 1, 2, 3, etc. By determining a monitoring periodicity with a period, which may be longer than the minimum monitoring period, the monitoring may take place less frequently in time domain, thereby saving power resources of the user device. However, it should be appreciated that block 502 may be omitted in implementations in which the monitoring occurrence periodicity is always the same as the periodicity of the period A. The block 502 may be omitted also in implementations in which the monitoring periodicity will be the same as the periodicity of the period A regardless of the occurrence periodicity.

Then the user device updates at block 503 its physical downlink control channel configuration to be the received configuration and follows the recent received configuration.

Naturally, if an embodiment supports that the user device maintains information on two or more physical downlink control channel configurations, one or more of them may be received at block 501, and updated at block 502 correspondingly.

Referring to FIG. 6, the user device has received at block 600 a physical downlink control channel (PDCCH) configuration. (The user device performs in block 600 a process described above with FIG. 5.)

When start of the period A is detected in block 601, the user device monitors in block 602 the beginning of the period according to the received physical downlink control channel configuration. For example, if the monitoring periodicity is the period A, the user device monitors monitoring occasions in the first slot(s), to detect whether the downlink control information schedules an uplink (UL) resource (block 603) or a downlink (DL) resource (block 604) to the user device. If the monitoring periodicity is an $x^{th}$ multiple of the period A, x being 2, 3, 4, etc., the user device monitors monitoring occasions in the first slot(s), of every $x^{th}$ period A to detect whether the downlink control information schedules an uplink (UL) resource (block 603) or a downlink (DL) resource (block 604) to the user device.

If an uplink resource is scheduled (block 603: yes), the user device transmits in block 605 data according to the transport block mapping in the physical downlink control channel configuration and the resource indicated in the downlink control information. For example, if the configuration 204 in FIG. 2 is used, the slots B0 to B5 each comprise the same piece of data. If the configuration 203 in FIG. 2 is used, it depends on the resource allocated, which slots, or a slot, are used for transmitting, but the slots contain different pieces of data.

If a downlink resource is scheduled (block 604: yes), the user device receives in block 606 data according to the transport block mapping in the physical downlink control channel configuration and the resource indicated in the downlink control information. For example, if the configuration 204 in FIG. 2 is used, the user device receives in slots B0 to B5 the same piece of data. If the configuration 203 in FIG. 2 is used, it depends on the resource allocated, which slots, or a slot, are used for receiving data, but the slots contain different pieces of data.

If no uplink resource (block 603: no) and no downlink resource (block 604: no), the user device waits until it detects, again, in block 601, start of the period A.

If the user device is configured to monitor physical downlink control channel according to two or more configurations in parallel, the user device may perform in parallel the functionality described above for each such configuration.

Referring to FIG. 7, the user device has received at block 700 two or more physical downlink control channel (PDCCH) configurations, for example to be used for frequencies above 52.6 GHz. (The user device performs in block 700 a process described above with FIG. 5.) Further, it is assumed that the configurations have the same period A and are aligned in time domain.

When start of the period A is detected in block 701, the user device determiners in block 702 which one of the two or more physical downlink control channel (PDCCH) configurations is to be used, or is both to be used. The decision may be based on aggregation level known by the user device. For example, if the aggregation level is 4, the user device may use configuration 203, and if the aggregation level is 8, the user device may use configuration 204. The user device monitors in block 703 corresponding monitoring occasions at the beginning of the period according to the determined physical downlink control channel configuration(s). For example, if the monitoring periodicity is the period A, and the determined configuration is the configuration 203, the user device monitors monitoring occasions in the first slot(s) to detect whether the downlink control information schedules an uplink (UL) resource (block 704) or a downlink (DL) resource (block 705) to the user device. If the monitoring periodicity is an $x^{th}$ multiple of the period A, x being 2, 3, 4, etc., and the determined configuration is the configuration 203, the user device monitors monitoring occasions in the first slot(s) of every $x^{th}$ period A to detect whether the downlink control information schedules an uplink (UL) resource (block 704) or a downlink (DL) resource (block 705) to the user device. If the monitoring periodicity is the $x^{th}$ multiple of the period A, and the determined configuration is the configuration 204, the user device monitors monitoring occasions in the two first slots of every $x^{th}$ period A to detect whether the downlink control information schedules an uplink (UL) resource (block 704) or a downlink (DL) resource (block 705) to the user device. If the monitoring periodicity is the period A, and the determined configuration is the configuration 204, the user device monitors monitoring occasions in the first two slots of each period A to detect whether the downlink control information schedules an uplink (UL) resource (block 704) or a downlink (DL) resource (block 705) to the user device.

If an uplink resource is scheduled (block 704: yes), the user device transmits in block 706 data according to the transport block mapping in the physical downlink control channel configuration and the resource indicated in the downlink control information. For example, if the configuration 204 in FIG. 2 is used, the slots B0 to B5 each comprise the same piece of data. If the configuration 203 in FIG. 2 is used, it depends on the resource allocated, which slots, or a slot, are used for transmitting, but the slots contain different pieces of data.

If a downlink resource is scheduled (block 705: yes), the user device receives in block 707 data according to the transport block mapping in the physical downlink control channel configuration and the resource indicated in the downlink control information. For example, if the configuration 204 in FIG. 2 is used, the user device receives in slots B0 to B5 the same piece of data. If the configuration 203 in FIG. 2 is used, it depends on the resource allocated, which slots, or a slot, are used for receiving data, but the blocks contain different pieces of data.

If no uplink resource (block 704: no) and no downlink resource (block 705: no), the user device waits until it detects, again, in block 701, start of the period A.

User devices are configured with physical downlink control channel configurations by a base station, usually called gNB in the new radio, or by a corresponding network node.

Figure 8:
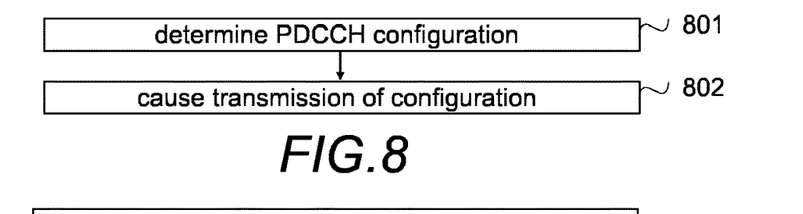

Referring to FIG. 8, the base station determines in block 801 a physical downlink control channel configuration. The configuration may be a common configuration or a user device-specific configuration. Further, the base station may be configured to take into account an aggregation level and/or a beam form when determining the physical downlink control channel.

The aggregation level indicates how many control resource elements are used for transmitting one downlink control information. For example, using the configurations in FIG. 2, the configuration 203 may be used for aggregation levels up to and including four and the configuration 204 may be used for aggregation level 8.

As to the beam form, a wider a beam is, the more efficient beam sweeping over a cell area is achieved, at least in terms of time resources used, for example. However, a wider beam has a lower signal to noise relation caused by a lower beam gain. The lower signal to noise relation may be compensated using a higher aggregation level and a repetition of physical downlink control channel, provided by the configuration 204 (control resource set B) in FIG. 2. The base station may have been configured to use for the common control resource set, to schedule and transmit remaining minimum system information (RMSI), a wide beam and the control resource set B, and for user device-specific control resource sets a narrow beam and control resource sets A. (Use of the wide beam means that the number of beams to cover a cell area is smaller, and hence RMSI, required for initial access by all served user devices, can be transmitted in a faster manner, compared to the use of a narrow beam.) In another example, using the configurations in FIG. 2, the base station may be configured to use the configuration 203 with a beam with a width below a threshold, and the configuration 204 with a beam with a width above the threshold.

Once the configuration has been determined, transmission of the configuration is caused in block 802 to configure at least one user device (wireless device) for periodic downlink control channel monitoring in a cell provided by the base station.

Figure 9:
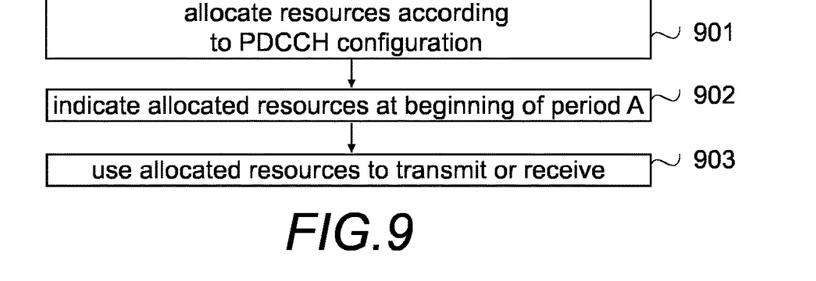

The configuration used also affects to resource allocation. In the example of FIG. 9, a concept called a maximum scheduling unit is used. It comprises the slots, or partial slots, in the minimum scheduling unit and in the one or more slots having symbols occupied by a control resource set, those symbols that are not occupied by the control resource set and/or by physical downlink control channel(s) transmitted by the base station.

Referring to FIG. 9, the base station allocates in block 901 resources for uplink and/or downlink data according to the configuration, i.e. from the maximum scheduling unit defined by the configuration, using the principles disclosed above with FIG. 2, and indicates in block 902 allocated resources at the beginning of the period A, which comprises the allocated resources. Naturally the base station uses in block 903 the allocated resources to transmit or receive data.

The blocks, related functions, and information exchanges described above by means of FIGS. 2 to 9 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information.

Figure 10:
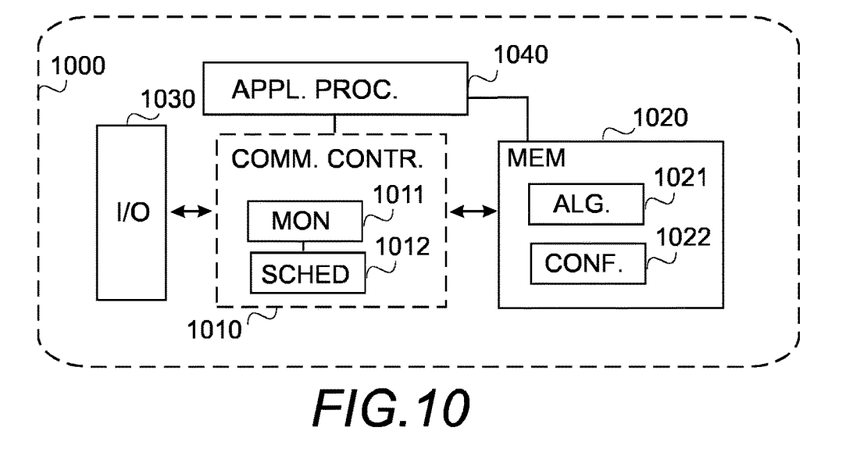
FIGS. 10 and 11 are schematic block diagrams.
Figure 11:
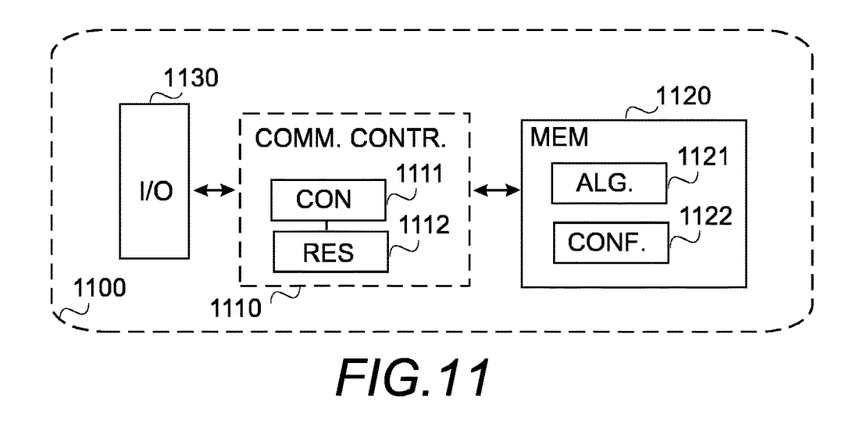

FIGS. 10 and 11 illustrate apparatuses comprising a communication controller 1010, 1110 such as at least one processor or processing circuitry, and at least one memory 1020, 1120 including a computer program code (software, algorithm) ALG. 1021, 1121, wherein the at least one memory and the computer program code (software, algorithm) are configured, with the at least one processor, to cause the respective apparatus to carry out any one of the embodiments, examples and implementations described above. FIG. 10 illustrates an apparatus for the user device, and FIG. 11 illustrates an apparatus for the network node (base station). The apparatuses of FIGS. 10 and 11 may be electronic devices.

Referring to FIGS. 10 and 11, the memory 1020, 1120 may be implemented using any suitable data storage technology, such as semiconductor based memory devices, flash memory, magnetic memory devices and systems, optical memory devices and systems, fixed memory and removable memory. The memory may comprise a configuration storage CONF. 1021, 1121, such as a configuration database, for at least storing one or more configurations and/or corresponding parameters/parameter values for physical downlink control channel monitoring and/or predefined transport block mapping(s). The memory 1020, 1120 may further store a data buffer for data waiting to be processed (including transmission).

Referring to FIG. 10, the apparatus 1000 may further comprise a communication interface 1030 comprising hardware and/or software for realizing communication connectivity according to one or more radio communication protocols. The communication interface 1030 may provide the apparatus with radio communication capabilities with one or more base stations (access nodes) of a wireless network. In an embodiment/example/implementation, the communication interface 1030 comprises one or more antenna arrays providing the apparatus with capability of forming directive transmission radio beams and the reception radio beams above 52.6 GHz. The communication interface may comprise standard well-known analog radio components such as an amplifier, filter, frequency-converter and circuitries, conversion circuitries transforming signals between analog and digital domains, and one or more antennas. Digital signal processing regarding transmission and reception of signals may be performed in a communication controller 1010.

The apparatus 1000 may further comprise an application processor 1040 executing one or more computer program applications that generate a need to transmit and/or receive data through the base stations. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application.

The communication controller 1010 may comprise a monitoring circuitry MON 1011 configured to perform physical downlink control channel monitoring of the apparatus according to any one of the embodiments/examples/implementations described above. The communication controller 1010 may further comprise a scheduling circuitry SCHED 1012 configured to detect resources allocated to the apparatus for transmitting or receiving data and to perform mapping accordingly. The communication controller 1010 may control the monitoring circuitry 1011 to receive configurations, to store them, to detect start of monitoring occasions and the scheduling circuitry 1012 to transmit or receive. The scheduling circuitry 1012 may control the communication interface 1030 to transmit or receive data.

Referring to FIG. 11, the apparatus for the base station comprises a communication interface 1130 comprising hardware and/or software for realizing communication connectivity according to one or more radio communication protocols. The communication interface 1130 may provide the apparatus with communication capabilities to user devices (terminal devices) camping in one or more cells controlled by the base station. In an embodiment, the communication interface may comprise one or more antenna arrays providing the apparatus with capability of forming directive transmission radio beams and the reception radio beams above 52.6 GHz. The communication interface may comprise standard well-known components such as an amplifier, filter, frequency-converter, (de)modulator, and encoder/decoder circuitries and one or more antennas.

The communication controller 1110 comprises a radio controller circuitry CON 1111 configured to control functions of terminal device (s) connected to the access node. The radio controller circuitry may, for example, configure the terminal device to perform monitoring of the physical downlink control channel according to any one of the embodiments/examples/implementations described above. Upon receiving resource request for data to/from the user device, a resource allocating circuitry RES 1112 may be triggered. The radio controller circuitry 1111 may communicate the reserved resources to the user device through the communication interface 1130.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the base station.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 4 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including computer program code;
   the at least one memory and the computer program code configured to, with the at least one processor, cause the apparatus at least to:
      receive from a network node a first configuration for physical downlink control channel monitoring, the first configuration defining a first minimum monitoring period, which comprises a plurality of slots, a first control resource set occupying one or more symbols in one or more slots at the beginning of the first minimum monitoring period, and one or more search spaces associated with the first control resource set; and
      perform downlink control channel monitoring periodically with a first monitoring periodicity, which is N times the first minimum monitoring period, wherein N is a positive integer, by monitoring according to the received first configuration the one or more symbols in the one or more slots at the beginning of a first monitoring period.

2. The apparatus of claim 1, wherein the at least one processor and the computer program code are further configured to:
   receive a second configuration for physical downlink control channel monitoring, the second configuration defining a second minimum monitoring period, which comprises a plurality of slots, a second control resource set occupying one or more symbols in one or more slots at the beginning of the second minimum monitoring period, and one or more search spaces associated with the second control resource set; and
   perform downlink control channel monitoring periodically with a second monitoring periodicity, which is M times the second minimum monitoring period, wherein M is a positive integer, by monitoring according to the received second configuration the one or more symbols in the one or more slots at the beginning of a second monitoring period.

3. The apparatus according to claim 2, wherein the second minimum monitoring period comprises the same amount of slots as the first minimum monitoring period.

4. The apparatus according to claim 2, wherein the first control resource set occupies a different number of symbols than the second control resource set.

5. The apparatus according to claim 2, wherein the at least one processor and the computer program code are further configured to:
   perform the downlink control channel monitoring with the second monitoring periodicity using the same demodulation reference signal sequence, which is used for the downlink control channel monitoring with the first monitoring periodicity.

6. The apparatus according to claim 2, wherein the first control resource set and the second control resource set overlap at least partially in time and the means are further configured to perform the downlink control channel monitoring using the same channel estimates or the same demodulation reference signal sequence.

7. The apparatus according to claim 1, wherein the search space defines one or more monitoring occasions with occurrence periodicity with respect to the corresponding minimum monitoring period and the occurrence periodicity defines how many minimum monitoring periods the corresponding monitoring period comprises.

8. The apparatus according to claim 1, wherein the at least one processor and the computer program code are further configured to:
   detect in the one or more symbols monitored a resource allocated to the apparatus, the resource comprising one or more symbols within the corresponding minimum monitoring period;
   receive, in response to the resource allocated being a downlink resource, data in the resource; and
   transmit, in response to the resource allocated being an uplink resource, data in the resource.

9. The apparatus according to claim 8, wherein the at least one processor and the computer program code are further configured to:
   perform data mapping to the resource based on information received in the one or more symbols monitored, and based on the size of the corresponding control resource set.

10. The apparatus according to claim 1, wherein, in the received configuration the one or more slots at the beginning of the corresponding minimum monitoring period are followed by one or more slots not occupied by the control resource set in the corresponding minimum monitoring period.

11. An apparatus comprising:
    at least one processor; and
    at least one memory including computer program code;
    the at least one memory and the computer program code configured to, with the at least one processor, cause the apparatus at least to:
       determine a first configuration for physical downlink control channel monitoring, the first configuration defining a first minimum monitoring period, which comprises a plurality of slots, a first control resource set occupying one or more symbols in one or more slots at the beginning of the first minimum monitoring period, and one or more search spaces associated with the control resource set;
       transmit the first configuration in a cell provided by the apparatus to configure at least one wireless device in the cell for periodic downlink control channel monitoring with a first monitoring periodicity, which is N times the first minimum monitoring period, wherein N is a positive integer;
       schedule transmissions by allocating resources within the first minimum monitoring period at least from one or more slots not having symbols occupied by the first control resource set; and
       transmit, according to the first configuration, within the one or more symbols, information indicating the resources.

12. The apparatus of claim 11, wherein the at least one processor and the computer program code are further configured to:
    determine at least one second configuration for physical downlink control channel monitoring, the second configuration defining a second minimum monitoring period, which comprises a plurality of slots, a second control resource set occupying one or more symbols in one or more slots at the beginning of the second minimum monitoring period, and one or more search spaces associated with the second control resource set;

transmit the second configuration in the cell to configure at least one wireless device in the cell for periodic downlink control channel monitoring with a second monitoring periodicity, which is M times the second minimum monitoring period, wherein M is a positive integer;

schedule transmissions by allocating resources within the second minimum monitoring period at least from one or more slots not having symbols occupied by the second control resource set; and transmit, according to the second configuration, within the one or more symbols, information indicating the resources.

13. The apparatus according to claim 12, wherein the at least one processor and the computer program code are further configured to:

determine which one of the first and second configurations to use based on aggregation level and/or beam width used.

14. The apparatus of claim 11, wherein the first control resource set provides one of a single slot per transport block scheduling and a repetitive transport block scheduling, wherein in the single slot per transport block scheduling transport blocks are mapped to single transport blocks, and/or multiple transport blocks are mapped to multiple slots, and each transport block is transmitted in a single slot, and wherein in the repetitive transport block scheduling a single transport block per spatial layer is mapped to multiple slots, and one transport block is transmitted in each of the multiple slots.

15. The apparatus according to claim 2, wherein the first control resource set provides one of a single slot per transport block scheduling and a repetitive transport block scheduling, and the second control resource set provides another one of the single slot per transport block scheduling and the repetitive transport block scheduling, wherein in the single slot per transport block scheduling transport blocks are mapped to single transport blocks, and/or multiple transport blocks are mapped to multiple slots, and each transport block is transmitted in a single slot, and wherein in the repetitive transport block scheduling a single transport block per spatial layer is mapped to multiple slots, and one transport block is transmitted in each of the multiple slots.

16. The apparatus according to claim 1, wherein the at least one processor and the computer program code are further configured to:

support one or more subcarrier spacings including and above 240 KHz.

17. A method comprising:

configuring an apparatus with at least one configuration for physical downlink control channel monitoring, wherein a configuration defines a minimum monitoring period, which comprises a plurality of slots, a control resource set occupying one or more symbols in one or more slots at the beginning of the minimum monitoring period, and one or more search spaces associated with the control resource set;

configuring the apparatus by receiving in the apparatus the at least one configuration; and performing downlink control channel monitoring periodically with a monitoring periodicity, which is N times the minimum monitoring period, wherein N is a positive integer, by monitoring according to the configuration the one or more symbols in the one or more slots at the beginning of a monitoring period.

18. The method according to claim 17, further comprising:

detecting in the one or more symbols monitored a resource allocated to the apparatus, the resource comprising one or more symbols not occupied by the control resource set within the minimum monitoring period;

receiving, in response to the resource allocated being a downlink resource, data in the resource; and transmitting, in response to the resource allocated being an uplink resource, data in the resource.

19. The method according to claim 17, wherein the minimum monitoring period comprises after the one or more slots at the beginning one or more slots not occupied by the control resource set.

20. The method according to claim 17, further comprising:

determining, by a second apparatus providing a cell, the at least one configuration;

configuring the apparatus for periodic downlink control channel monitoring with a monitoring periodicity, which is N times the minimum monitoring period, wherein N is a positive integer, by transmitting, by the second apparatus, the at least one configuration in the cell;

scheduling, by the second apparatus, transmissions by allocating resources within the minimum monitoring period at least from one or more slots not having symbols occupied by the control resource set; and transmitting, according to the at least one configuration, within the one or more symbols, information indicating the resources.

* * * * *